350-266.
01-09-73    OR    3,709,584
SR

United States Patent [19]
Frungel

[11] 3,709,584
[45] Jan. 9, 1973

[54] LIGHT BLOCKING ARRANGEMENT
[75] Inventor: Frank Frungel, Hamburg, Germany
[73] Assignee: Impulsphysik GmbH, Hamburg, Germany
[22] Filed: Dec. 11, 1969
[21] Appl. No.: 884,177

[30] Foreign Application Priority Data

Dec. 18, 1968  Germany.....................P 18 15 249.3

[52] U.S. Cl..................................350/266, 250/217
[51] Int. Cl.................................................G02f 1/30
[58] Field of Search ......350/266, 267, 269; 343/100; 356/71; 250/226, 217

[56] References Cited

UNITED STATES PATENTS 3,321,630   5/1967   Durig et al.........................250/226 X
3,342,540   9/1967   Abegg et al. .........................350/267

OTHER PUBLICATIONS

Dickinson, H. & Tamarkin, P., "Systems for the Detection and Identification of Nuclear Explosions in the Atmosphere and in Space." Proceedings of the IEEE, Vol. 53 No. 12, December, 1965, pp. 1921-1934.
Marks, J. Carson, "The Detection of Nuclear Explosions." Nucleonics. Vol. 17, No. 8, August 1959, pp. 54-73.
Champeny, J. C., et al.; "Nuclear Bomb Alarm Systems." Electronics, May 8, 1959, pp. 53-55.

*Primary Examiner*—Ronald L. Wibert
*Assistant Examiner*—T. Major
*Attorney*—Michael S. Striker

[57] ABSTRACT

A chamber with two normally transparent walls is arranged in the path of light. Injectors mounted on the wall of the chamber inject carbon to cover the transparent walls upon receipt of electromagnetic and light signals signifying a nuclear detonation.

14 Claims, 7 Drawing Figures

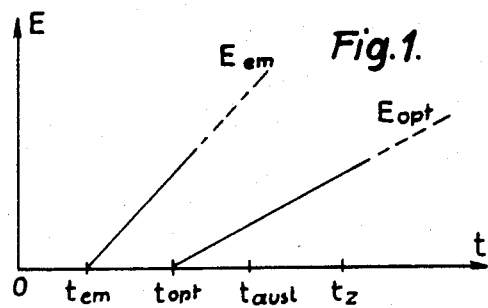
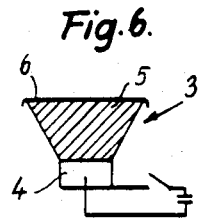
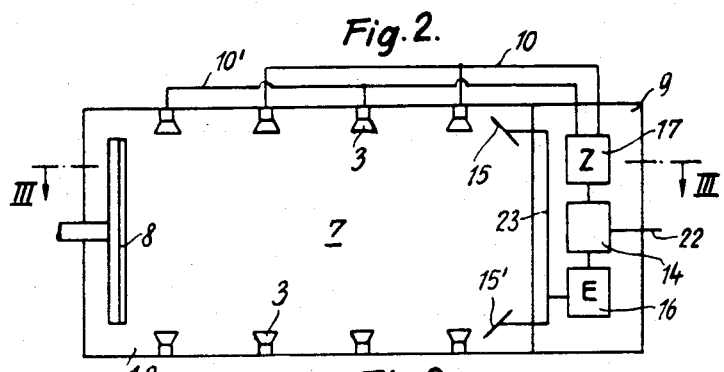
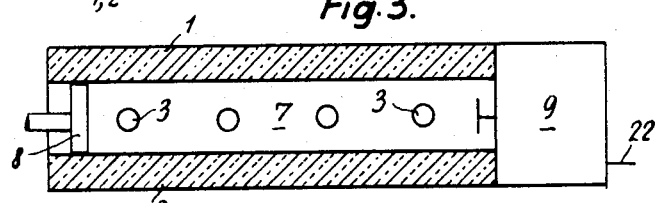
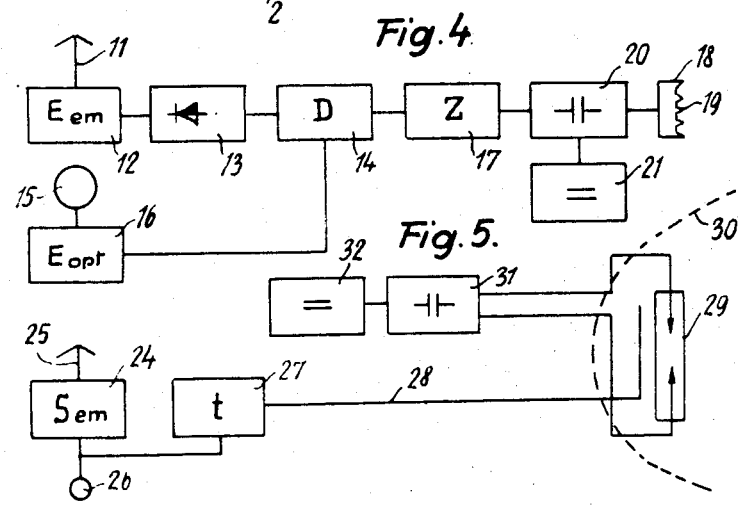

LIGHT BLOCKING ARRANGEMENT

BACKGROUND OF THE INVENTION

This invention relates to a light blocking arrangement which blocks light automatically upon the occurrence of a nuclear detonation.

As a result of nuclear detonation, persons which are otherwise well shielded may suffer eye damage or blindness. This may, for example, occur when soldiers in bunkers are in combat vehicles are visually linked to the outer world by means of observation equipment as for example periscopes. Further, an atomic blast may also damage optical equipment when the optical elements alone are exposed to the blast.

The present invention is based on the knowledge that a nuclear detonation results first in an electromagnetic impulse having a steep leading edge, followed within a short period of time by the light pulse, which also has a rapidly rising leading edge. Thus a sure sign of a nuclear detonation which may cause optical damage is the appearance of an electro-magnetic pulse having a predetermined leading edge slope, followed after a predetermined time interval by a light pulse having a predetermined light slope. Both the electro-magnetic slope and the light slope resulting from such an explosion and the time interval between the two pulses are known data which were determined a long time ago. The date is furnished in the following discussion, as well as in a number of references from which this data may be derived.

According to reference 1, page 8, (R.W. Cottermann Electromagnetic Detection of Nuclear Weapons, Information Paper of ITT, (Unclassified), 1965 by Robert W. Cottermann, Fort Wayne Laboratory, ITT Communications Systems, Chicago, Illinois) the rise time of the EMP is less than 100 nano seconds, with an accompanying field strength of $10^4$ V/m.

This data coincides with reference 2, FIG. 6.1 (Special Information Products Department, Defense Electronics Division Syracuse, N.Y. General Electric, title: Nuclear yield measurement equipment. (Unclassified) from which a field strength of $2.10^3$ V/m may be derived for a 0.1 KT explosion (the minimal explosion here postulated) at a distance of 0.2 km from ground zero.

Reference 3, ("Propagation of the Ground Wave Electromagnetic Signal, with Particular Reference to a Pulse of Nuclear Origin" by J.R. Johler, proceedings of the IEEE December 1965, vol. 53, No. 12, page 2043) in FIG. 2 yields a field strength of 60/m at a distance of 44.6 km for a nuclear detonation of medium strength.

Finally, reference 4 (Satellite-Based Detection of the Electromagnetic Signal from Low and Intermediate Altitude Nuclear Explosions by William J. Karzas and Richard Latter, Momorandum RM-4542 of June 1965, of the Rand Corporation) on page 5 furnishes a minimal field strength of more than $10^3 \cdot d^{-1}$ volts per meter, where $d$ is in kilometers. This data is in close agreement with that furnished in reference 1 for field strength of $10^4$ V/m for the field near ground zero.

By the rules furnished herein for the decrease of the electromagnetic pulse with distance, a minimal sensitivity for an EMP sensor of 10 V/m for a detonation taking place at a distance of 100 kilometers may be specified, the sensor being adapted to detect a slope of at least 10 V/musec during 10 nano seconds. This value also agrees well with that furnished in reference 5, (Nuclear Yield Measurement Equipment, Special Information Products Department, Defense Electronics Division, General Electric, Syracuse, N.Y.) wherein, on page 5, the threshold value from instruments determining the yield of nuclear bursts is stated to be between 5 to 50 volts per meter.

According to reference 1, page 4, an atomic explosion releases a certain signal sequence with determined time intervals. The sequence always commences with an initial gamma radiation and simultaneously with the electromagnetic pulse. After a known time interval, the light flash follows. When the time interval which is characteristic of the yield of the weapon is known, as well as the rate of rise of the optical flash, then, together with the above-mentioned characteristics of the electromagnetic pulse, recognition of an atomic blast in a very early stage may be achieved. The initial values of the slope of the light flash may be derived from Glasstones, "Effects of Nuclear Weapons" 1962 edition, page 75. In conjunction with the "Scaling Law"

$$T_i = 20 \left(\frac{t_i}{\sqrt{y}}\right)^2 + 32.6 \frac{t_i}{\sqrt{y}} - 3.7$$

$$t_i = \sqrt{\frac{y}{20}} \{3.65 - \sqrt{9.62 - T_i}\} \quad \text{or simplified } t_i = t_{iKT}\sqrt{y_{KT}}$$

where $Y = KT$, for a temperature $T_i$ and a time $t_i$; it may be computed that the light flash of a 0.1 kiloton weapon, that is the fastest weapon, begins only after 7.1 microseconds together with an effective surface temperature of 2600°K. For a two-megaton weapon, the corresponding time is 1 millisecond. The effective rate of rise of the light flash at this time corresponds to the rate of rise of temperature of a beam of 2600°–5000°K and is at least 0.45 W/cm² sec. corresponding to 3 Lux/sec.⁻.b

SUMMARY OF THE INVENTION

In accordance with the above discussion, this invention comprises a light blocking arrangement for blocking light generated by a nuclear detonation. The light is travelling along a determined path, and the invention comprises blocking means arranged in said path and adapted to block the passage of light along said path. It further comprises electromagnetic sensing means for furnishing a first signal corresponding to a received electromagnetic pulse. Also furnished are optical sensing means for furnishing a second signal in response to a received light pulse. Finally, circuit means are provided for furnishing the activation signal for activating the blocking means in response to a first signal corresponding to an electromagnetic pulse having a leading edge slope exceeding a predetermined electromagnetic leading edge slope, followed within a predetermined time interval by a second signal corresponding to a light pulse having a leading edge slope exceeding a predetermined light slope, said light pulse further having a magnitude exceeding a predetermined light magnitude.

In a preferred embodiment of the invention, the blocking means comprise a normally transparent chamber. The chamber has injector means for injecting an opaque substance onto at least one wall of said chamber in response to the activation signal, thereby blocking the passage of light along said path. The opaque substance may, for example, be carbon or graphite. The chamber may be in a housing which is joined to the housing containing the electrical circuits which furnish the activation signal only when the previously-defined signals are furnished by the optical and the electromagnetic sensors. It is desirable that the injector chamber and the circuit housing be mechanically combined in a fashion in which it is again easy to separate, in particular plug-in units are desirable. The activation signal may, for example, be given by the circuit means when the electromagnetic sensor senses a pulse of slope exceedings 10 volts per meter per microsecond while the optical sensor receives a light pulse having a light slope of 3 Lux per microsecond after the time interval of between 5 microseconds and 1 millisecond.

The optical sensor may either be mounted directly within the injection chamber or may be placed next to the injection chamber and connected via a light conductor.

Furthermore, as a characteristic of the present invention, the injection chamber may have a first and second thin, plastic-elastic transparent cover of limited elasticity.

The injectors may be mounted on the sides joining the edges of the transparent plastic sheets. The injectors may be combined into a number of groups, individual injectors belonging to different groups alternating along the sides. In this case, the blocking arrangement may be used a number of times, if a wiper for wiping the transparent sheets is supplied.

It may be desirable to test the blocking arrangement of this invention. For this a special test signal generator may be supplied which has a transmitter which furnishes an electromagnetic pulse of more than 10 V/m.us at a distance of 1000 meters, and is connected to a time delay member which, after a time interval of 5 microseconds to 1 millisecond, generates an ignition pulse for a flash tube, which may for example be energized by the discharge from a capacitor, said flash tube being able to generate a light pulse of a slope exceeding 3 Lux per microsecond at the same distance.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a diagram showing the variation with respect to time of the electromagnetic and the light pulses;

FIG. 2 is a schematic top view of a blocking arrangement in accordance with the present invention;

FIG. 3 is a section taken along line III—III of FIG. 2;

FIG. 4 is a block diagram of the circuit means of the present invention;

FIG. 5 is a block diagram of the transmitting unit for furnishing test signals; and FIG. 6 is a schematic sectional view of an injector.

DESCRIPTION OF THE PREFERRED EMBODIMENTS

Figure 4A:
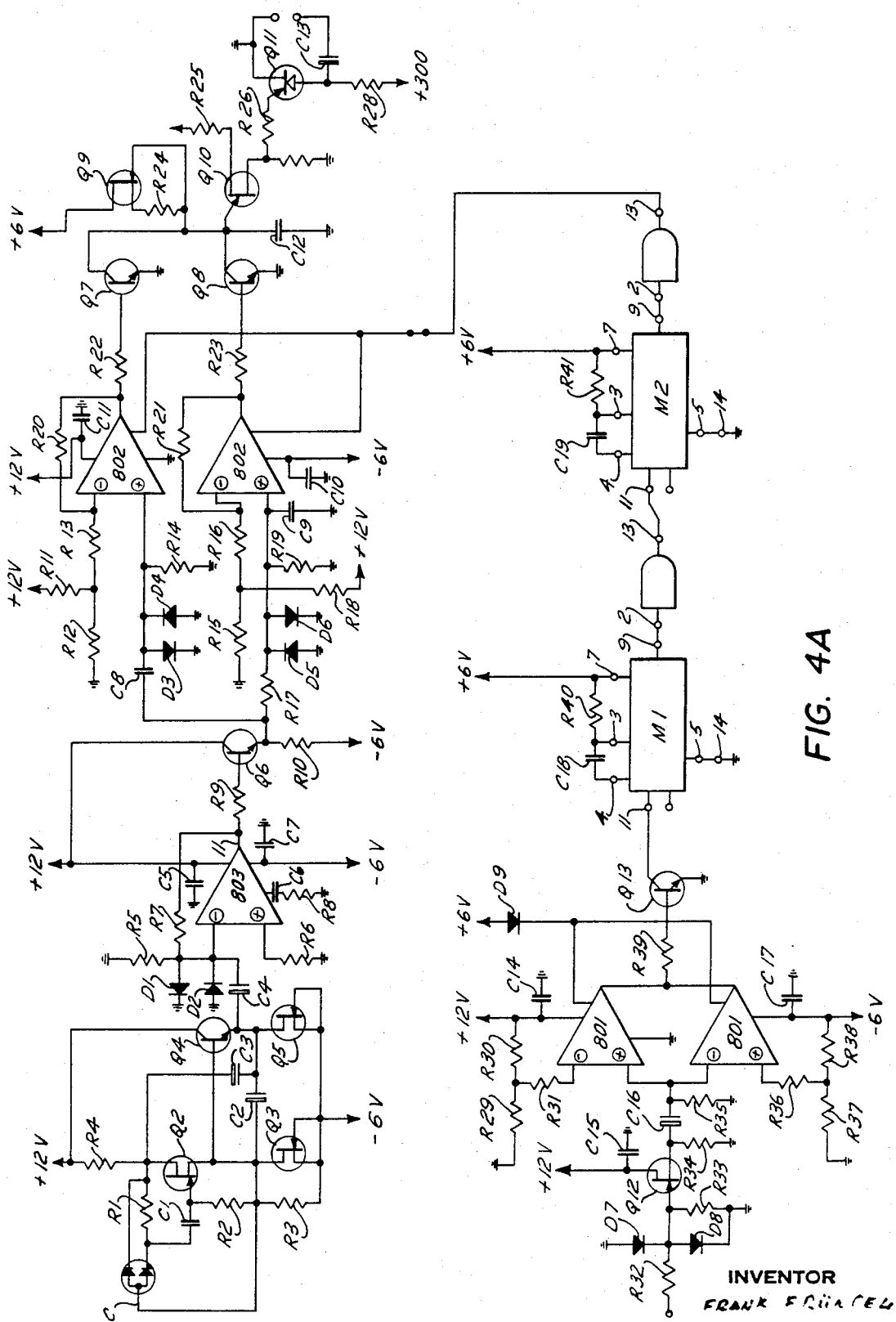
FIG. 4a shows the circuit diagram corresponding to the block diagram of FIG. 4.

A preferred embodiment of the present invention will now be described with reference to the drawing.

FIG. 1 is a schematic showing the effects of a nuclear detonation. It is assumed that the detonation takes place at time zero. At a determined time following time zero, namely at time $t_{em}$ an electromagnetic pulse of predetermined slope appears. The slope should exceed 10 V/m.us. After further delay time of between 5 microseconds and 1 millisecond, at a time denoted by $t_{opt}$ a light pulse appears which should have a slope of 3 Lux/us. At the beginning, the energy of the light pulse is still small and only causes minimal damage. However the energy increases rapidly to cause the previously-mentioned damage. It is the object of the invention to activate a blocking arrangement as fast as possible after time $t_{opt}$, which blocks the light sufficiently rapidly that the high energy part of the light pulse is blocked. The time at which the blocking arrangement is activated, is indicated in FIG. 1 with $t_{aust}$. It is assumed that the arrangement blocks the light completely at the time indicated by $t_z$.

The blocking arrangement illustrated in FIGS. 2 and 3 consists of two parallel transparent thin sheets of limited elasticity, 1,2, with injectors mounted at the sides joining the edges with a tight joint. An injector is shown in FIG. 6. Preferably, the injectors inject carbon. In the bottom of the injector, an ignition charge 4 with an initial explosive charge of known composition, as for example lead acid, is located. In the conical section above, graphite or carbon, preferably xylol-carbon is located. The carbon charge 5 is covered with a thin synthetic film 6 at its outer surface. The film may for example be generated by hair spray. The activation of the injectors takes place in accordance with the method described below by means of a condensor discharge of, for example, 40 Ws, which is obtained by charging a capacitor of 0.1 microfarads to a corresponding voltage and causing the capacitor to be discharged at the correct time, namely time $t_{aust}$ of FIG. 1.

Between the two transparent sheets 1 and 2, which may be separated by a distance of 3.5 centimeters or more, is the actual injection chamber 7. A wiper 8 is mounted on one wall of the injection chamber, in such a manner that it is able to wipe the two inside surfaces of the transparent sheets 1 and 2. Preferably, this wiper is manually activated. On the side opposite to the wiper, a plug-in housing 9, which will be described in more detail below, is located. This contains the electrical circuits of the blocking arrangement. The activation or ignition signal for the injectors 3 is furnished via ignition lines 10 and 10'. As may be noted with reference to FIG. 2, the injectors 3 are arranged in groups. The members of the group alternate around the periphery of the chamber. This provides the possibility of using the blocking arrangement twice. If, for the first blocking operation, the activation pulse is furnished via line 10, then only one-half of the injectors 3 is activated. After the transparent sheets have been blackened, the injection chamber may be cleaned by means of wiper 8, so that the arrangement may be put into operating condition again, by furnishing the next activation pulse via line 10'. The injectors are arranged in such a way, that the injectors on one side do not line up directly with the injectors belonging to the same group on the other side. Of course the possibility is also opened of using more than two groups of injectors, with a correspondingly larger number of ignition lines. In this manner, of course, the chamber may be used even more than twice.

The speed of the injection depends upon the chemical structure. Experiment has shown that it is advantageous if for an optimum energy transmission between the injection charge and the carbon charge to be injected, a small air cushion of, for example, 10 ... 100 cubic millimeters is provided. This allows sufficient acceleration of the carbon that blocking times of between 30–60 microseconds may be achieved, corresponding to an exit velocity of the carbon cloud of between 1500 and 2000 meters per second. This velocity may be attained even under normal atmospheric pressure within the chamber, that is without necessity of a vacuum.

FIG. 4 shows a block diagram of the electrical components of the blocking arrangement. An electromagnetic pulse is received by an antenna 11 and furnished to the electromagnetic receiver 12. The output of the electromagnetic receiver 12 is fed to an amplifier 13. This amplifier 13 serves to limit the electromagnetic pulse, thus preventing excessive energy from penetrating to the following circuitry. Reception of the light pulse is achieved by an optical sensor 15, which furnishes a signal to photoelectric transducing means 16. Unit 16 furnishes the second signal to a discriminator unit 14. This discriminator unit 14 furnishes the activation signal, if a first signal corresponding to an electromagnetic pulse of predetermined slope, has been furnished, and a second signal corresponding to a light pulse of between 4000 and 6000 A, with a predetermined light slope, arrives within a predetermined time interval. As previously mentioned, the injectors 3 are ignited by means of a condensor discharge. In FIG. 4, the numeral 18 indicates the block wherein a number of ignition coils 19 are connected in series to form a group. The ignition coils 19 of course are part of the injectors 3. The ignition coils 19 receive their energy from a capacitor 20, which may for example be charged to between 300 and 500 volts. The charging means are denoted by 21. If the discriminator has determined that an atomic detonation has taken place, then the activation signal is furnished to unit 17 which connects the charged capacitor 20 with the ignition coils 19. A selector switch may be connected between the capacitor 20 and the ignition coils 19 of two or more groups. This yields the capability to fire different injector groups in sequence.

FIG. 4a shows elements of the block diagram of FIG. 4 in greater detail and contains all electronic components in the above-explained sequence. Components 14, 15, 16, 17, 20 and 21, as shown in FIG. 4, are preferably located in a plug-in unit 9. The input of the unit 9 is connected via line 22 to the output of amplifier 13. Further, of course, the housing 9 must be supplied with the power sources required. From this unit 9, the injectors 3 are supplied with energy via lines 10 and 10'.

The photoelectric transducer housed in unit 9 may receive the light pulse directly over a side of the injector chamber 7. However, preferably, it is connected via a photoconductor to sensor 15 and 15' which are directly with the injector chamber. If, as shown in FIG. 2, two optical sensors connected in parallel are used, the axes of major sensitivity should diverge in order to allow a maximum coverage of the visual field.

As shown in FIG. 4a, the electromagnetic pulse is furnished at R32 and is analyzed in a differential comparator stage. If a predetermined positive or negative threshold is exceeded, Q13 furnishes a trigger pulse. This pulse triggers monostable multivibrator M1, whose "on" time is determined by C18 and R40.

The output pulse of the multivibrator is differentiated and, after a time period determined by the "on" time of M1, a second monostable multivibrator M2 is switched. The "on" time of the second multivibrator is determined by C19 and R41. During this "on" time, two voltage comparators 802 are switched to the "ready" state via lines strobe 1 and strobe 2. In other words, as long as a voltage appears at strobe 1 and strobe 2, a signal arriving at the input of this stage causes the generation of an output pulse.

The turn-on level for stage 802 is determined by resistors R11 and R12, R13, R15, R16, and R18.

Q7 and Q8 are "normally on" switches. If they are opened simultaneously, C12 is charged over constant current generator Q9. After a predetermined time interval, dependent upon Q9, R24 and C12, Q10 is switched and controls the ignition of Q11, a solid state thyritron.

When Q11 becomes conductive as mentioned above, C13 discharges, thus activating the ignition of the injector.

The light pulse is received by photodiode Q1. Q2, Q3, Q4 and Q5 form a cathode follower unit which, by means of feedback, decreases the input capacitance of Q2 to a minimum. Operational amplifier 803 and Q6 serve to amplify the output of the cathode follower unit. The so-amplified output is then differentiated by C8 and R14 and integrated by the integrating elements R17 and C9. Thus at the common point of C8 and R14, the voltage is proportional to the slope of the leading edge of the pulse, while the voltage at the common point of R17 and C9 is proportional to the total amount of light received during the pulse. It can thus be seen that the activation signal for the injectors, provided by the discharge of C13, only takes place when an output appears at both stages labelled 802. This in turn is only possible when an electromagnetic pulse having a predetermined leading edge slope is followed after a predetermined time interval by a light pulse also having a slope exceeding a predetermined light slope and, further, having an amplitude exceeding a predetermined amplitude.

Since, surprisingly, the carbon to be injected shows hydroscopic characteristics, some exsiccator material is arranged in the chamber 7 in order to counteract these tendencies. This exsiccator material may be arranged in the form of exchangeable cartridges. It is also possible to include this exsiccator material directly within the carbon injector 3.

In order to be able to test the above-described blocking arrangement, or to use this blocking arrangement during maneuvers, it is further suggested in accordance with this invention that special transmitting means be furnished, as illustrated schematically in FIG.

5. This includes a transmitter 24 which, upon activation of a release key 26, furnishes, via its antenna 25, an electromagnetic pulse of more than 10 V/m us at a distance of 1000 meters. Connected with this transmitter 24 are time delay means, 27, which generates a time delay starting with the activation of the release key 26. At the expiration of the time delay, an ignition pulse for flash tube 29 is furnished via line 28. This flash tube is able to generate a pulse of more than 3 Lux/us light slope at the above-mentioned distance. The time delay means is so adjusted that the time delay furnished covers the range of between 5 microseconds to 1 millisecond. The flash tube 29 may be equipped with a parabolic mirror 30 and is furnished energy from a condensor 31, which in turn is charged by a unit 32.

While the invention has been illustrated and described as embodied in particular circuits and particular blocking arrangements, it is not intended to be limited to the details shown, since various modifications, structural and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. Light blocking arrangement for blocking light generated by a nuclear detonation and travelling along a determined path, comprising, in combination, blocking means arranged in the path of the light and adapted to block the passage of light along said path in response to an activation signal; first sensing means for furnishing a first signal corresponding to a received radio pulse; optical sensing means for furnishing a second signal in response to a received light pulse; and circuit means for furnishing said activation signal in response to a threshold first signal corresponding to a radio pulse having a leading edge slope exceeding a predetermined radio leading edge slope, followed within a predetermined time interval by a threshold second signal corresponding to a light pulse having a leading edge slope exceeding a predetermined light slope and a magnitude exceeding a predetermined light magnitude.

2. An arrangement as set forth in claim 1, wherein said optical sensing means comprise a first and second optical sensor having respectively a first and a second axis of maximum sensitivity, said first and second optical sensors being mounted in such a manner that said first axis of maximum sensitivity extends in a first direction and said second axis of maximum sensitivity extends in a second direction different from said first direction; and means connecting said optical sensors in parallel.

3. An arrangement as set forth in claim 1, wherein said circuit means comprise first circuit means furnishing a gating signal in response to said threshold first signal; and second circuit means furnishing said activation signal in the presence of said gating signal and said threshold second signal.

4. An arrangement as set forth in claim 1, wherein said first circuit means comprise means furnishing a first output signal in response to a first signal having a leading edge slope exceeding 10 V/mus; means delaying said first output signal for substantially 5 microseconds thereby furnishing a delayed first output signal; means for furnishing a gating signal of substantially one millisecond width in response to said delayed first output signal.

5. An arrangement as set forth in claim 1, wherein said blocking means comprises a chamber having a first and second transparent plastic sheet, substantially parallel to one another; a first and second wall connecting said first and second sheets and substantially perpendicular thereto; and further comprising a plurality of injectors for injecting an opaque substance arranged along said walls, each of said injectors comprising a cartridge having an electrically ignitable injection charge.

6. An arrangement as set forth in claim 5, wherein said injectors are electrically connected to form a first and a second group, individual injectors of the first group alternating in position with individual injectors of the second group; further comprising wiper means for wiping said sheets attached to said first wall.

7. An arrangement as set forth in claim 1, wherein said predetermined light magnitude is 4000 A.

8. An arrangement as set forth in claim 5, wherein said opaque substance is carbon.

9. An arrangement as set forth in claim 5, wherein said optical sensing means comprise an optical sensor mounted on said chamber; photoelectric transducing means for furnishing said first signal; and light conducting means for interconnecting said optical sensor and said photoelectric transducing means.

10. An arrangement as set forth in claim 5, wherein said circuit means are mounted in a housing, said housing being plugably connected to said chamber.

11. An arrangement as set forth in claim 5, wherein said opaque substance is xylol carbon.

12. An arrangement as set forth in claim 5, wherein said injectors have an injector charge and an air cushion between said injection charge and said opaque substance.

13. An arrangement as set forth in claim 12, wherein said chambers further contain exsiccator material; and cartridges containing said exsiccator material.

14. An arrangement as set forth in claim 1, further comprising a transmitting unit for furnishing test signals for said light blocking arrangement, said transmitting unit comprising means for generating an electromagnetic pulse of more than 10 V/m us, at a distance of 1000 meters; time delay means for furnishing an ignition signal after a time delay of from 5 microseconds to 1 millisecond following said electromagnetic pulse; and light flash generating means, responsive to said ignition signal for furnishing a light flash having a leading edge slope of more than 3 Lux/us at the same distance.

* * * * *